United States Patent [19]

Adachi et al.

[11] Patent Number: 5,486,331
[45] Date of Patent: Jan. 23, 1996

[54] PROCESS FOR DEGREASING CERAMIC MOLDED BODIES

[75] Inventors: Masakazu Adachi, Nagoya; Kouichi Imao, Kagamihara, both of Japan

[73] Assignee: NGK Insulators, Ltd., Japan

[21] Appl. No.: 225,073

[22] Filed: Apr. 8, 1994

Related U.S. Application Data

[63] Continuation of Ser. No. 944,028, Sep. 11, 1992, abandoned, which is a continuation of Ser. No. 726,733, Jul. 2, 1991, abandoned, which is a continuation of Ser. No. 436,641, Nov. 15, 1989, abandoned.

[30] Foreign Application Priority Data

Nov. 15, 1988 [JP] Japan .................. 63-286886

[51] Int. Cl.⁶ .................................. C04B 33/32
[52] U.S. Cl. .............................. 264/344; 264/63
[58] Field of Search ........................ 264/344, 63

[56] References Cited

U.S. PATENT DOCUMENTS

| | | | |
|---|---|---|---|
| 4,704,242 | 11/1987 | Bandyopadhyay | 264/63 |
| 4,713,206 | 12/1987 | Matsuhisa et al. | 264/344 |
| 4,923,652 | 5/1990 | Murakawa | 264/344 |
| 5,021,208 | 6/1991 | Ludwig | 264/344 |

FOREIGN PATENT DOCUMENTS 3507804  3/1989  Germany .
61-77671 4/1986 Japan ........................ 264/63

OTHER PUBLICATIONS

Soviet Inventions Illustrated, Section Ch, Week C42, Nov. 26, 1980, Derwent Publications Ltd.

Derwent Accession No. 87–139 575, Questel Telesystems (WPIL), Derwent Publications Ltd.

Derwent Accession No. 84–278 269, Questel Telesystems (WIPL), Derwent Publications Ltd.

Primary Examiner—James Derrington
Attorney, Agent, or Firm—Parkhurst, Wendel & Rossi

[57] ABSTRACT

A process for degreasing ceramic molded bodies containing a large quantity of paraffin wax includes a constant-temperature heating conducted for a certain period of time appropriately determined according to the size and shape of the ceramic molded bodies, at a temperature immediately below the temperature for the ceramic molded bodies to begin contraction, essentially in a low temperature region wherein the contraction occurs due to liquefaction of the paraffin wax and optionally in a high temperature region wherein the contraction occurs due to thermal decomposition of the paraffin wax. According to the process of the invention, build-up of stress in the ceramic molded bodies by heating is prevented and a temperature gradient between the surface and the inside of the molded bodies is leveled, so that crack-free molded bodies are obtained with a shortened degreasing schedule.

10 Claims, 3 Drawing Sheets

FIG_4
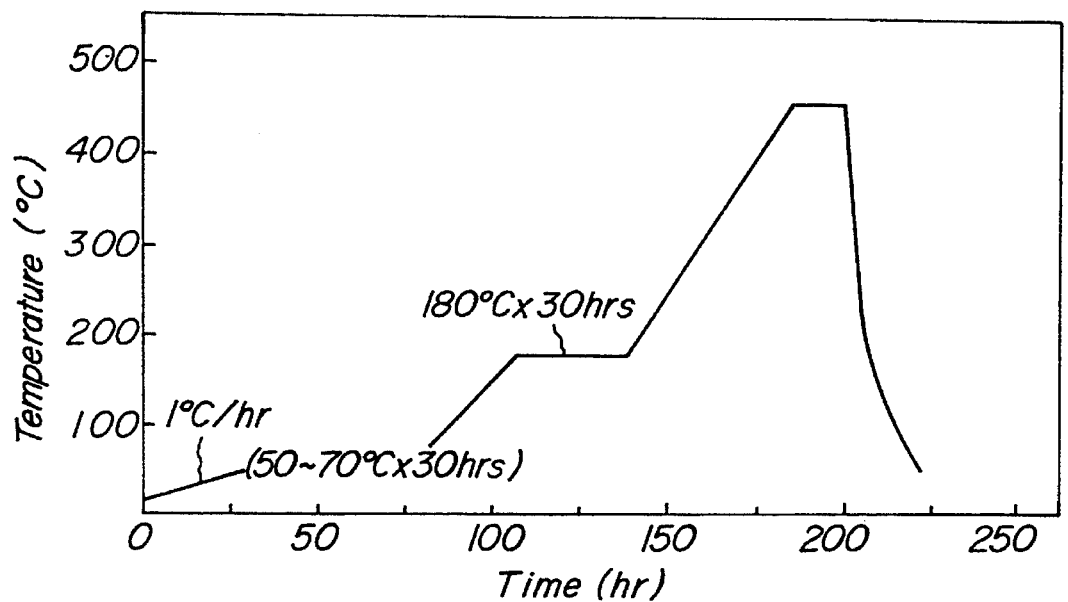
FIG_5
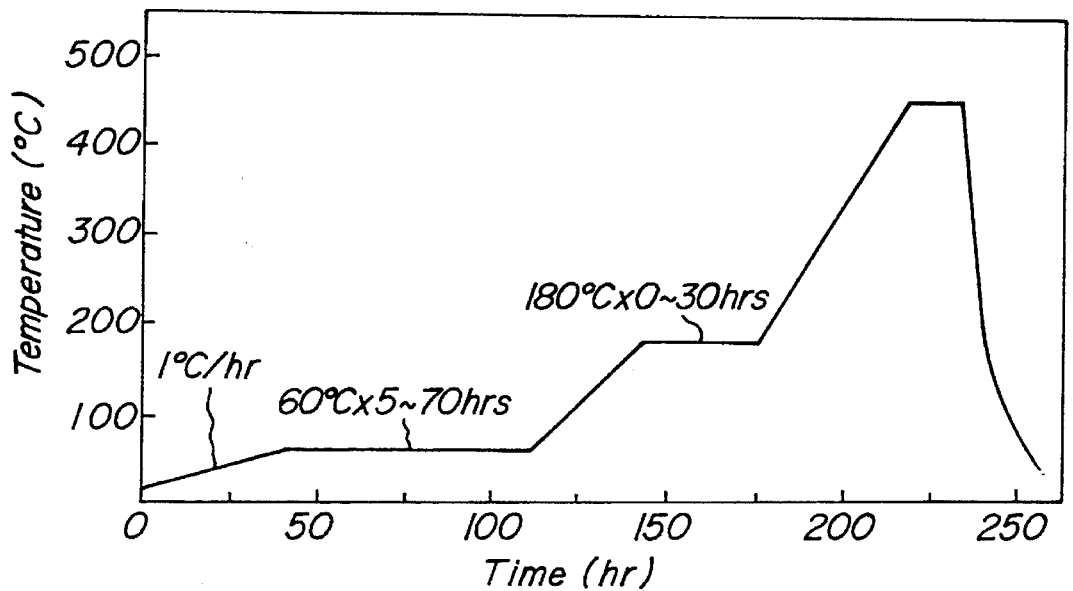

PROCESS FOR DEGREASING CERAMIC MOLDED BODIES

This is a continuation of patent application Ser. No. 07/944,028 filed Sep. 11, 1992, now abandoned, which in turn is a continuation of patent application Ser. No. 07/726,733 filed Jul. 2, 1991, now abandoned, which in turn is a continuation of patent application Ser. No. 07/436,641, filed Nov. 15, 1989, now abandoned.

BACKGROUND OF THE INVENTION

1. Field of the Invention

The present invention relates to a process for heat-degreasing ceramic molded bodies containing an organic binder mainly comprising paraffin wax, wherein the organic binder is removed in a short period of time without forming cracks or deformation.

2. Description of the Prior Art

In the case where ceramic shaped bodies, such as turbocharger rotors, turbine rotors or the like, of intricate shape, are molded by injection molding or cast molding, a ceramic starting powder is incorporated with a large quantity of an organic binder, such as a thermoplastic resin, wax or the like, in order to improve moldability and then molded into ceramic shaped bodies. The shaped bodies containing a large quantity of the organic binder require a degreasing step to remove the organic binder therefrom by means of thermal decomposition, dissolution with an organic solvent, or the like, prior to sintering.

The heat-degreasing is a method for removing organic binders by thermal decomposition and gasification thereof. However, build-up of stress due to gases or heat of reaction evolving during the thermal decomposition of the binders causes cracks or deformation. Particularly, this tendency is remarkable in thick molded bodies or intricately shaped articles, such as turbocharger rotors or the like. Therefore, it has a disadvantage such that the temperature must be elevated very slowly, so that the degreasing usually requires 20–30 days.

Japanese Patent Application Laid-open No. 62-78,165 discloses a degreasing process wherein a first degreasing step is conducted at a temperature lower than the decomposition temperature of the binder in an oxidizing atmosphere and then a second degreasing step is conducted at the decomposition temperature or higher of the binder in a non-oxidizing atmosphere. However, this process has difficulties such that the degreasing time is not so shortened as a whole because the molded bodies which have been cooled down are taken out and then heated again, since semi-degreased molded bodies are readily damaged in handling, and since a non-oxidizing atmosphere is required, and the like.

SUMMARY OF THE INVENTION

The object of the present invention is to obviate the above-described difficulties by providing a novel process for degreasing ceramic molded bodies wherein an organic binder mainly comprising a paraffin wax of about 20–35 carbon atoms, can be removed within a short period of time, without forming cracks.

The process for degreasing ceramic molded bodies according to the present invention, wherein an organic binder mainly comprising paraffin wax contained in the ceramic molded bodies is removed by heating in an oxidizing atmosphere, is characterized in that a constant-temperature heating is conducted for a predetermined period of time at a temperature immediately below the temperature for said ceramic molded bodies to commence contraction, at least in a low temperature region of two regions: a low temperature region wherein the contraction occurs due to liquefaction of said paraffin wax; and a high temperature region wherein the contraction occurs due to thermal decomposition of said paraffin wax.

BRIEF DESCRIPTION OF THE DRAWINGS

The invention will now be described with reference to the accompanying drawings wherein:

FIGS. 4 and 5 are graphs, each showing an example of the degreasing schedule according to the present invention.

DETAILED DESCRIPTION OF THE INVENTION

Figure 1:
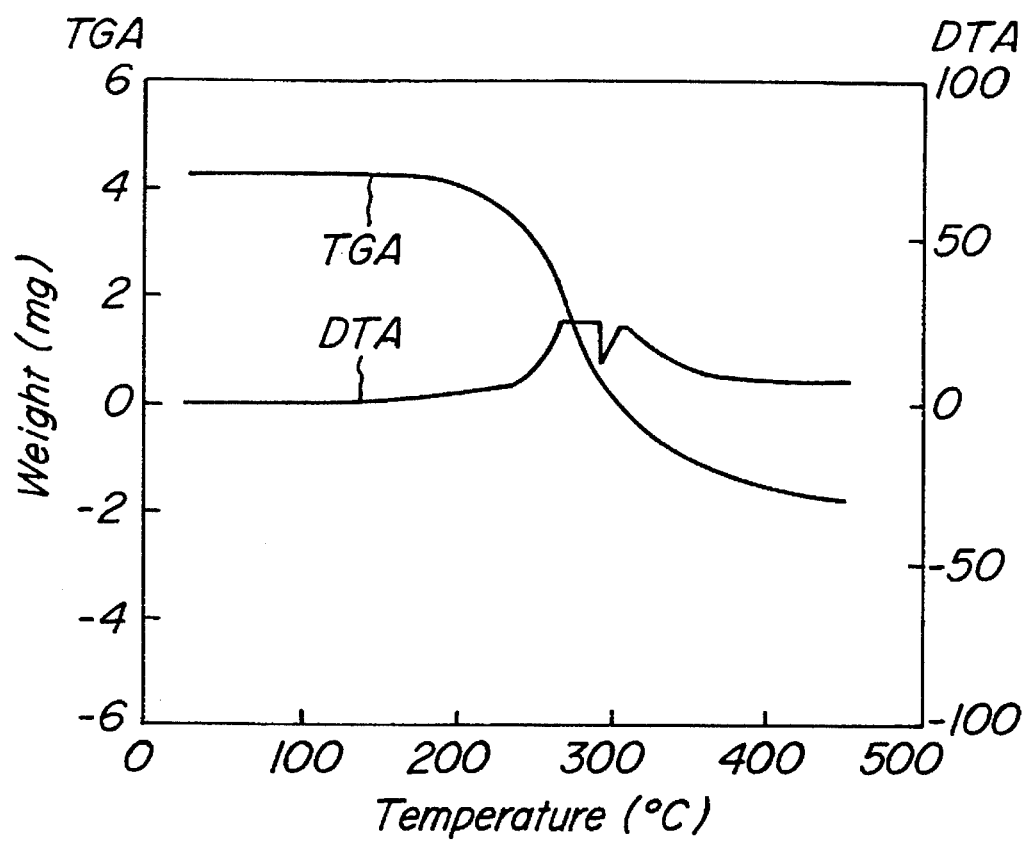
FIG. 1 is a graph showing TGA and DTA curves of a test-piece cut out from a ceramic molded body i.e. the object of the present invention.

The mechanism of the crack formation of injection molded bodies is accounted for in that the cracks are formed due to a loss in weight and an exothermic peak in the temperature range of 180°–400° C., as seen from the TGA (thermogravimetric analysis) curve and the DTA (differential thermal analysis) curve, respectively, of the test-piece cut out from a molded body, shown in FIG. 1. This is because the wax undergoes an oxidation reaction to evolve heat or gases whereby stress is built up and causes crack formation. Accordingly, the built-up stress has heretofore been released by conducting a gradual oxidation reaction of the wax, according to a very slow heating schedule as described above, at such a low temperature increasing rate as 0.5° C./hr particularly in the temperature range of 180°–400° C., or by means of heating at 180° C. for a predetermined period of time, or stepwise constant-temperature heatings.

The present invention has been achieved by the finding, through determination of thermal expansion of molded bodies to find the magnitude of the stress built up therein, that a rapid expansion occurs from room temperature to 60° C., whereas a sudden contraction occurs in the low temperature region of 60°–70° C. as well as in the high temperature region of 180°–220° C. Namely, it has been found that the stress causing the crack formation is built up during contraction and that a contraction not accompanied by change in weight takes place also between 60° C. and 70° C. which has not been found from the TGA curve. This temperature region is inherent in wax binders, wherein the wax binders are converted from solid into a liquid. Namely, since the expansion and contraction in this low temperature region occur within a very narrow temperature range, in the case of thick molded bodies the expansion and the contraction occur simultaneously within the whole body in relation to heat transfer and induce build-up of a high stress resulting in crack formation.

Further, since high stress is also built up at the contraction temperature in the high temperature region, it has been found that a temperature gradient in the molded body can be leveled by stopping temperature increase and maintaining a constant temperature in both the low temperature region for the expansion and contraction and the high temperature region for the contraction or by heating at a very low rate of temperature increase, such as 0.5° C./hr or less, whereby the building-up of stress can be restrained to prevent the crack formation. Furthermore, it also has been found that there arises no problem even if the temperature is rapidly increased in other temperature regions, as far as the heating at a constant temperature is conducted for a predetermined period of time in those two regions.

The present invention will be explained hereinafter in more detail by way of example.

Example 1

On the outset, a thermal analysis was conducted of a molded body containing an organic binder comprising paraffin wax as a main component and its expansion and contraction were examined.

Silicon nitride ($Si_3N_4$) powder incorporated with a small amount of sintering aids was admixed with an organic binder comprising, as a main component, paraffin wax (SP-3035, manufactured by Nippon Seiro K.K.) in volume ratios of the silicon nitride powder to the organic binder of 45/55, 50/50 and 55/45. The mixtures were kneaded while heating under pressure and then pelletized to prepare three kinds of injection molding compounds. Each of the three kinds of injection molding compounds was molded with an injection molding machine at an injection pressure of 400 kg/cm$^2$, an injection temperature of 70° C. and a mold temperature of 45° C., into three kinds of ceramic columnar bodies, 2 cm in diameter and 2 cm long, 4 cm in diameter and 4 cm long and 6 cm in diameter and 6 cm long, respectively. First, a test-piece of 3 mm×3 mm×3 mm was cut out from the molded body of the above ratio 50/50 and subjected to a thermal analysis. The result is shown in FIG. 1. As is seen from FIG. 1, the weight begins to decrease when the temperature exceeds 180° C. and is substantially stabilized at about 450° C. Alternatively, it shows that the heat of reaction beings to increase gradually from around 180° C. until it develops violently at around 290° C.

Figure 2:
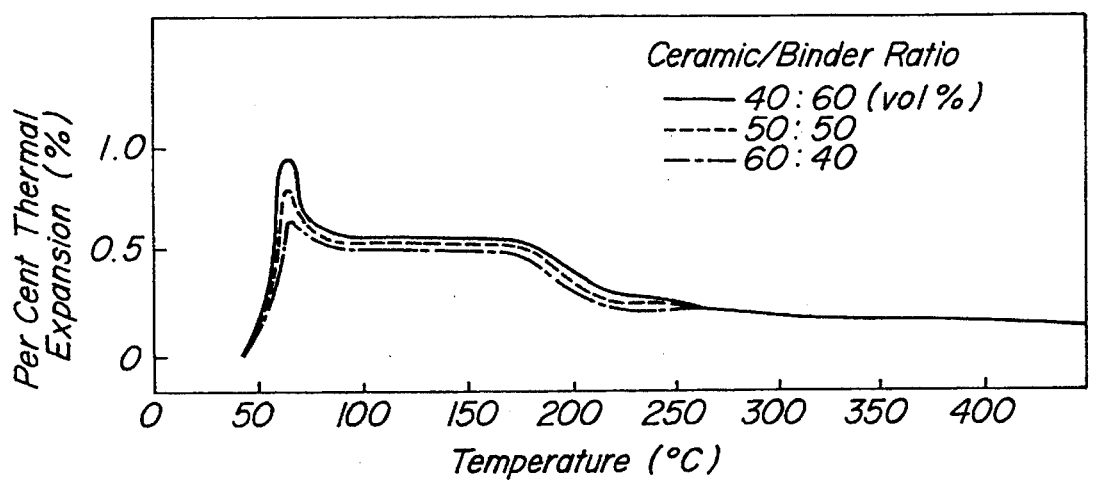
FIG. 2 is a graph showing a thermal expansion characteristic also of a ceramic molded body.

In order to examine thermal expansion properties of the ceramic molded bodies, each test-piece 5 mm in diameter and 40 mm long for measuring thermal expansion was cut out from the columnar bodies molded from 3 kinds of molding compounds, respectively. Using the Model 2S.2F-TMA manufactured by Rigaku Denki K.K. as a measuring apparatus, measurements were conducted at a temperature increasing rate of 1° C./hr from room temperature up to 450° C. The result is shown in FIG. 2. As is seen from FIG. 2, it was observed that rapid expansion and contraction of the ceramic molded bodies occurred at around 60° C. due to the liquefaction of the paraffin wax. Further, contraction also occurred at around 180° C. due to thermal decomposition of the paraffin wax. It has been found that the degrees of the expansion and contraction are obviously heightened as the content of the organic binder increases, namely, the above degrees increase in order of 45/55, 50/50 and 55/45 of the volume ratio of the ceramic to the organic binder.

Secondly, the influence of maintaining a constant temperature was examined.

Figure 3:
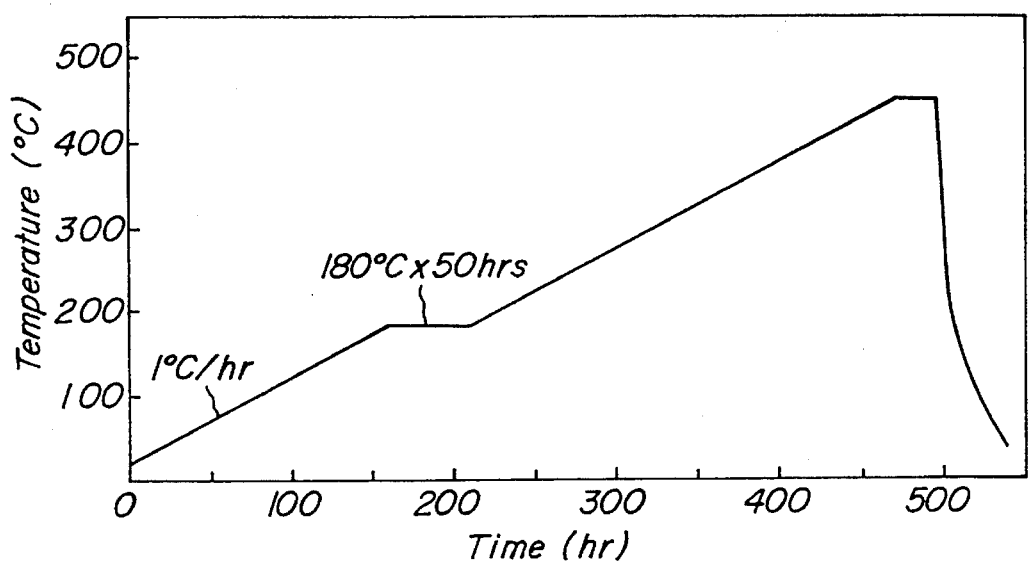
FIG. 3 is a graph showing a conventional degreasing schedule.

Since the rapid expansion and contraction were found to occur at around 60° C. how the cracks would be formed in the degreasing step was examined in the case where the temperature was maintained in the range of 50°~70° C. The samples used in the experiment were 20 test-pieces each of 3 kinds, differing in size, of columnar injection molded bodies which were the same as those used in the foregoing examination. The test-pieces were buried in alumina powder of 80~100 μm particle diameters and degreased in an oxidizing atmosphere using a degreasing oven of a hot flue type manufactured by Kyowa Konetsu Kogyo K.K. The experiment was conducted according to two degreasing schedules: a conventional one as shown in FIG. 3, comprising a total 550 hour schedule wherein the temperature was increased at a temperature increase rate of 1° C./hr up to 180 ° C. at which temperature the paraffin wax began to thermally decompose and then maintained at 180° C. for 50 hours; and the other one as shown in FIG. 4, comprising a shortened, total 220 hour schedule wherein the temperature was maintained at 50°~70° C. for 30 hours around which temperature the paraffin wax was liquefied and then maintained at 180° C. for 30 hours. The result is shown in Table 1 below.

TABLE 1

| Temp. maintained for 30 hrs. (°C.) | Crack formation ratio (%) ||||||||
|---|---|---|---|---|---|---|---|---|
| | Ceramic/Binder ||||||||
| | 55:45 ||| 50:50 ||| 45:55 |||
| | Dia. of Test-piece (cm) ||||||||
| | 2 | 4 | 6 | 2 | 4 | 6 | 2 | 4 | 6 |
| —*1 | 100 | 100 | 100 | 100 | 100 | 100 | 100 | 100 | 100 |
| 50 | 80 | 90 | 100 | 100 | 100 | 100 | 100 | 100 | 100 |
| 55 | 60 | 80 | 95 | 80 | 90 | 100 | 85 | 100 | 100 |
| 60 | 0 | 0 | 15 | 0 | 0 | 25 | 0 | 0 | 30 |
| 65 | 100 | 100 | 100 | 100 | 100 | 100 | 100 | 100 | 100 |
| 70 | 100 | 100 | 100 | 100 | 100 | 100 | 100 | 100 | 100 |
| Conventional 550 hr Schedule | 0 | 0 | 0 | 0 | 0 | 5 | 0 | 0 | 10 |

*1 Temperature was increased at an increase rate of 1° C./hr up to 70° C.

It has been found from the result shown in Table 1 that the crack formation during degreasing can be largely obviated by maintaining the temperature at 60° C. (i.e., immediately below the temperature for molded bodies to begin contraction). Thus, the possibility for shortening the degreasing time schedule has been confirmed.

Lastly, the influence of maintenance time was examined.

Since it had been found that the crack formation during degreasing was extremely decreased by maintaining the temperature at about 60° C., the examination was conducted in the case where the maintenance time was varied over 5~70 hours. In a degreasing schedule as shown in FIG. 5, the maintenance time at 60° C. was varied, while the maintenance time at 180° C. was fixed to be 30 hours. The number of test-pieces and degreasing conditions were the same as the foregoing examination. The result is shown in Table 2 below.

TABLE 2

| Maintenance time at 60° C. (hrs) | Crack formation ratio (%) ||||||||| 
|---|---|---|---|---|---|---|---|---|
| | Ceramic/Binder ||||||||
| | 55:45 ||| 50:50 ||| 45:55 |||
| | Dia. of Test-piece (cm) |||||||||
| | 2 | 4 | 6 | 2 | 4 | 6 | 2 | 4 | 6 |
| 5 | 0 | 90 | 100 | 0 | 95 | 100 | 5 | 100 | 100 |
| 10 | 0 | 50 | 100 | 0 | 50 | 100 | 0 | 60 | 100 |
| 20 | 0 | 20 | 70 | 0 | 20 | 90 | 0 | 30 | 100 |
| 30 | 0 | 0 | 15 | 0 | 0 | 25 | 0 | 0 | 30 |
| 50 | 0 | 0 | 0 | 0 | 0 | 10 | 0 | 0 | 10 |
| 70 | 0 | 0 | 0 | 0 | 0 | 0 | 0 | 0 | 0 |

It is seen from Table 2 that the larger in size the molded bodies and the higher the binder content is, the longer should be the maintenance time. Particularly, with respect to the columnar test-piece 6 cm in diameter containing 55% binder, it has been found that maintenance for 70 hours or more can yield a crack-free degreased body.

Example 2

Along with the temperature maintenance in Example 1, constant-temperature heating was conducted at 180° C. varying the maintenance time, at which temperature the second contraction of ceramic molded bodies took place, and then possible crack formation was examined. The temperature increasing schedule was as shown in FIG. 5 wherein the temperature was maintained at 60° C. for 10 hours, 30 hours and 70 hours, respectively, for the columnar body 2 cm, 4 cm and 6 cm, in diameter, and then the temperature was maintained at 180° C. varying the maintenance periods of time over 0~30 hours. With respect to the number of the test-pieces and the degreasing conditions, Example 1 was followed. The result is shown in Table 3 below.

TABLE 3

| Maintenance time at 180° C. (hrs) | Crack formation ratio (%) ||||||||| 
|---|---|---|---|---|---|---|---|---|
| | Ceramic/Binder ||||||||
| | 55:45 ||| 50:50 ||| 45:55 |||
| | Dia. of Test-piece (cm) |||||||||
| | 2 | 4 | 6 | 2 | 4 | 6 | 2 | 4 | 6 |
| 0 | 30 | 35 | 80 | 30 | 40 | 90 | 40 | 50 | 100 |
| 5 | 0 | 0 | 10 | 0 | 5 | 20 | 0 | 10 | 20 |
| 10 | 0 | 0 | 10 | 0 | 0 | 10 | 0 | 10 | 20 |
| 15 | 0 | 0 | 5 | 0 | 0 | 10 | 0 | 5 | 15 |
| 20 | 0 | 0 | 5 | 0 | 0 | 5 | 0 | 0 | 10 |
| 25 | 0 | 0 | 0 | 0 | 0 | 0 | 0 | 0 | 5 |
| 30 | 0 | 0 | 0 | 0 | 0 | 0 | 0 | 0 | 0 |

It has been found from the result shown in Table 3 that though it depends upon the size of the molded bodies, the crack formation ratio is lowered by maintaining the temperature at 60° C. for a predetermined period of time, even when the maintenance time at 180° C. is considerably shortened. It has been found that crack-free good products can be obtained by maintaining 180° C. for at least 5 hours, at least 20 hours and at least 30 hours, respectively, for columnar bodies 2 cm, 4 cm and 6 cm, in diameter.

Example 3

Three kinds of injection molding compounds, the same as those in Example 1, were prepared and injection molded into 30 pieces each of 3 kinds of ceramic turbocharger rotors having vane spreads of 5 cm, 10 cm and 15 cm, respectively. Each molded body was buried in alumina powder and degreased. The degreasing schedule was set according to FIG. 5, wherein the maintenance periods of time at 60° C. were 10 hours, 30 hours and 70 hours, respectively, for 5 cm, 10 cm and 15 cm vane spreads, and the maintenance periods of time at 180° C. were 5 hours, 10 hours and 30 hours, respectively, for 5 cm, 10 cm and 15 cm vane spreads.

After the degreasing, the products were taken out of the alumina powder and no crack formation was observed through visual inspection.

As demonstrated above, according to the present invention, at the heating step in degreasing processes of ceramic injection molded bodies containing a large quantity of an organic binder, the temperature gradient between the surface and the inside of the molded bodies can be leveled to decrease build-up of stress, by virtue of heating at a constant temperature for the molded bodies to begin contraction for the first time, namely, for the wax binder to begin liquefaction, for example, at 60° C. for an appropriate period of time predetermined according to the size and shape of the molded bodies, and thus the crack formation can be prevented effectively.

Further, heating can be performed, at a temperature increase rate as high as at least 2 times the conventional rate, up to about 180° C. that is the temperature for the molded bodies to commence the second contraction due to thermal decomposition of the wax binders, and further the temperature maintenance time at around 180° C. can be decreased, so that the degreasing time is extremely shortened. Additionally, according to the present invention, the degreasing process can be conducted with one degreasing oven in an oxidizing atmosphere throughout the process, so that the degreasing is readily performed with neither requiring for semi-degreased molded bodies to be taken out in mid course, nor for a non-oxidizing atmosphere to be produced.

The process of the present invention is suitable for degreasing of injection molded bodies, such as not only members of ceramic turbocharger rotors, gas turbine rotors, or the like, but also automotive members or parts, for example, ceramic subcombustion chambers, ceramic valves or the like, and members for industrial application, for example, ceramic guide rolls, ceramic burner nozzles or the like.

What is claimed is:

1. A method of degreasing ceramic molded bodies, comprising the steps of:

forming a mixture into a plurality of ceramic molded bodies, said mixture comprising a ceramic material and an organic binder comprised of paraffin wax, and having a C/B ratio of 45:55 to 55:45, said C/B ratio being a volume ratio of said ceramic material to said organic binder;

determining a first contraction temperature of the ceramic molded bodies wherein the ceramic molded bodies undergo a first contraction while being heated;

embedding the ceramic molded bodies in alumina powder; and heating the ceramic molded bodies in an oxidizing atmosphere for a predetermined period of time at a first constant temperature to remove said organic binder, said first constant temperature being immediately below said first contraction temperature, whereby a crack formation ratio of the ceramic molded bodies is less than 60% after degreasing.

2. The method of claim 1, wherein said step of determining said first contraction temperature is carried out by plotting a thermal expansion curve of the ceramic molded bodies.

3. The method of claim 1, further comprising a step of determining a second contraction temperature of said ceramic molded bodies, wherein the ceramic molded bodies undergo a second contraction due to thermal decomposition of said paraffin wax while being heated.

4. The method of claim 3, wherein said step of determining a second contraction temperature is carried out by plotting a thermal expansion curve of the ceramic molded bodies.

5. The method of claim 3, further comprising a step of heating the ceramic molded bodies in said oxidizing atmosphere at a second constant temperature, said second constant temperature being immediately below said second contraction temperature.

6. The method of claim 5, further comprising a step of heating the ceramic molded bodies to a temperature of about 450° C.

7. The method of claim 1, further comprising the steps of heating the ceramic molded bodies at a third constant temperature of 450° C. for a predetermined period of time, and then cooling the ceramic molded bodies.

8. The method of claim 1, wherein the total heating time ranges between 220–250 hours.

9. The method of claim 1, wherein said ceramic molded bodies are held for not less than 30 hours at said first constant temperature.

10. A method of degreasing a ceramic molded body, comprising the steps of:

forming a mixture into a ceramic molded body, said mixture comprising a ceramic material and an organic binder comprised of paraffin wax, and having a C/B ratio of 45:55 to 55:45, said C/B ratio being a volume ratio of said ceramic material to said organic binder;

determining a first contraction temperature of the ceramic molded body wherein the ceramic molded body undergoes a first contraction while being heated;

embedding the ceramic molded body in alumina powder; and heating the ceramic molded body in an oxidizing atmosphere for a predetermined period of time at a first constant temperature to remove said organic binder, said first constant temperature being immediately below said first contraction temperature, whereby a crack formation ratio of the ceramic molded body is less than 60% after degreasing.

* * * * *